Patented June 14, 1938

2,120,405

UNITED STATES PATENT OFFICE 2,120,405

METHOD OF PREPARING HORMONES

Edwin L. Gustus, Kalamazoo, Mich., assignor to The Upjohn Company, Kalamazoo, Mich.

No Drawing. Application April 29, 1935, Serial No. 18,916

8 Claims. (Cl. 167—74)

The objects of this invention are:

First, to produce a new and satisfactory method for producing a sterile solution suitable for parenteral injection of the hormonal substances that exist in the blood or uterine tissues of animals of the equine group during early pregnancy. The hormonal substances referred to have been described in the paper, "Concentration of the gonadotropic hormone in pregnant mare's serum," by Evans, Gustus and Simpson, in the "Journal of Experimental Medicine," vol. 58, pp. 569–574, 1933, and have been referred to in my copending application, Serial No. 18,917, filed April 29, 1935, for Method of purifying gonadotropic hormonal substances, filed herewith which has resulted in Patent No. 2,072,258, patented Mar. 2, 1937. These substances appear in the blood and uterine tissues of animals of the equine group during the period from the thirtieth day to the two hundred thirtieth day of pregnancy and are found in the highest concentration at about the eightieth day of pregnancy.

Second, to provide a method of sterilizing solutions of the above referred to gonadotropic hormonal substances, which solutions are isotonic and of the proper degree of acidity to preserve the hormonal substances for the maximum length of time.

Third, to provide a method of bacteriologically filtering solutions of the above referred to hormonal substances.

Fourth, to provide a solution of the above referred to hormonal substances which is suitable for parenteral injection and in which the acidity is sufficient to preserve the hormonal substances, but in which the acidity is not sufficiently high to be unsuited for use in parenteral injections. I have found that the specific hormonal substances above referred to deteriorate less if the solution of these hormonal substances is kept at an acidity such that the pH is approximately 5.8, although at a pH of from 6 to 7 the hormonal substances will be well preserved and the solution will be suitable for parenteral injection, because the acidity is not so high as to cause discomfort to a patient to which it is administered parenterally. I have also found that these hormonal substances will be absorbed to most of the filters unless the conditions for filtration are maintained by maintaining the solution being filtered at the proper alkalinity.

In carrying out my invention, I take a purified aqueous solution of the gonadotropic hormonal substances. This solution may have been purified by the method disclosed in the above mentioned article by Evans, Gustus and Simpson, or by the method of my copending application for Letters Patent, Serial No. 18,917, filed April 29, 1936, for Method of purifying gonadotropic hormonal substances. To the purified aqueous solution I add an alkaline buffer salt. I preferably use disodium phosphate or dipotassium phosphate because these salts appear in the blood and make the final product more satisfactory for parenteral injection. It is essential that the salt be added in a quantity sufficient to maintain the solution at a pH of approximately 8.3 during the bacteriological filtering steps to follow. I have found that the filtering can proceed satisfactorily, however, if the pH drops to as low as 7.5 and that it will be satisfactory if the pH rises to a figure higher than 8.3.

I prefer to add to the solution at this point sufficient of the buffering salt so that at the later stages in which the solution is acidified, the mere addition of the acidifying reagent to bring the solution to a proper pH will also make the solution substantially isotonic with blood, thus eliminating additional steps and greatly simplifying the calculations necessary.

After the solution has been alkalinized by the addition of the buffer salt, I filter it through a Mandler filter or a Pasteur-Chamberland filter. The filter candles of the types referred to are the only ones that give satisfactory results at all. The others seemingly absorb such great quantities of the hormonal substances, even at the alkalinity referred to, that they do not give a satisfactory final product because most of the hormonal substances are removed in the filter.

After the solution has been filtered, I add aseptically thereto a sterile acidifying reagent. I prefer to add phosphoric acid because this is much simpler and gives very satisfactory results. The quantity of phosphoric acid added is a quantity sufficient to acidify the solution. I do this because I have found that the hormonal substances referred to keep better in an acid solution. If the pH is approximately 5.8, I have found that the solutions keep very satisfactorily, although if the pH is increased greatly above that the solutions deteriorate more, and if the pH is such that the solution is on the alkaline side, more deterioration also takes place. I prefer to maintain the pH between 6 and 7 because a solution with this acidity will preserve the hormonal substances satisfactorily and is suitable for parenteral injection in that the acidity is not so high as to be annoying to a patient to whom the substances are administered by injection. I also prefer to maintain the solution on the acid side rather than the alkaline because if there is any appreciable quantity of alkalinity, the glass of the ampules in which the substances are ordinarily kept may be attacked.

To determine whether or not the solution is isotonic with blood, one ordinarily compares the freezing point of the solution with that of blood, and it is well known that a depression of the freezing point approximately 5.5° C. below that of water makes the solution substantially isotonic with blood.

The following table indicates the desired quantities of disodium phosphate and of phosphoric acid to be employed to give the desired acid condition in the final product and to make the solution substantially isotonic with blood. The table shows in the first column the amount of disodium phosphate in water solution to be used with phosphoric acid. The amount of phosphoric acid of a strength of 0.773 molar appears in the second column. The third column indicates the grams of hydrated disodium phosphate to be used in a milliliter of water and the fourth column indicates the amount of phosphoric acid to be used in connection therewith. The fifth column indicates the resulting pH and the sixth column the resulting depression of the freezing point from that of water in degrees centigrade.

| $Na_2HPO_4$ 98.8% anhydrous U. S. P., grams/ml. of solution | $H_3PO_4$ 0.773 molar. sterile, ml/ml. | $Na_2HPO_4$, $12H_2O$ grams/ml. of solution | $H_3PO_4$ 0.773 molar. sterile, ml/ml. | pH | Freezing at depression |
|---|---|---|---|---|---|
| .0160 | .0191 | .0410 | .0196 | 7 | 5.5° C. |
| .0151 | .0404 | .0388 | .0415 | 6.5 | 5.5° C. |
| .0135 | .0588 | .0347 | .0605 | 6 | 5.5° C. |

It is also possible to use an acid phosphate instead of the acid and it would be merely a mechanical matter to calculate the exact amounts of disodium phosphate to be used in connection with sodium acid phosphate to give the desired pH and to make the solution substantially isotonic with blood.

Having thus described my invention, what I claim as new and desire to secure by Letters Patent is:

1. The method of producing for parenteral injection a sterile solution of gonadotropic hormonal substances of the type existing in the blood or uterine tissue of animals of the equine group during early pregnancy, comprising adding to a purified aqueous solution of said hormonal substances an alkaline buffer salt selected from the group consisting of disodium phosphate and dipotassium phosphate, controlling the quantity of said alkaline buffer salt so that the solution will be maintained over 7.5 during the manipulation and filtration of the material, and so that the final product when acidified to the desired pH will be substantially isotonic with blood, filtering the solution through a bacteriological filter of the Mandler or Pasteur-Chamberland type, adding to the filtered solution an acidifying substance selected from the group consisting of phosphoric acid, sodium acid phosphate and potassium acid phosphate so that the final solution will be sufficiently acid to best preserve the hormonal substances without being objectionable for parenteral injection and will be substantially isotonic with blood.

2. The method of producing for parenteral injection a sterile solution of gonadotropic hormonal substances of the type existing in the blood or uterine tissue of animals of the equine group during early pregnancy, comprising adding to a purified aqueous solution of said hormonal substances an alkaline buffer salt, controlling the quantity of said alkaline buffer salt so that the solution will be maintained substantially alkaline during the manipulation and filtration of the material and so that the final product when acidified to the desired pH will be substantially isotonic with blood, filtering the solution through a bacteriological filter of the Mandler or Pasteur-Chamberland type, adding to the filtered solution an acidifying substance selected from the group consisting of acids and acid buffer salts, and controlling the quantity of said acidifying substance so that the final solution will be sufficiently acid to best preserve the hormonal substances without being objectionable for parenteral injection and will be substantially isotonic with blood.

3. The method of producing for parenteral injection a sterile solution of gonadotropic hormonal substances of the type existing in the blood or uterine tissue of animals of the equine group during early pregnancy, comprising alkalinizing a purified aqueous solution of said hormonal substances to a pH of approximately 8.3, filtering the solution through a bacteriological filter of the Mandler or Pasteur-Chamberland type, and adding to the filtered solution an acid reagent to give the final solution a pH of from 6 to 7.

4. The steps in the method of producing for parenteral injection a sterile solution of gonadotropic hormonal substances of the type existing in the blood or uterine tissue of animals of the equine group during early pregnancy, comprising alkalinizing a purified aqueous solution of said hormonal substances to a pH of approximately 8.3, and filtering the solution through a bacteriological filter of the Mandler or Pasteur-Chamberland type.

5. A sterile solution for parenteral injection of gonadotropic hormonal substances of the type existing in the blood or uterine tissue of animals of the equine group during early pregnancy, comprising the product produced by adding to a purified aqueous solution of said hormonal substances an alkaline buffer salt selected from the group consisting of disodium phosphate and dipotassium phosphate, controlling the quantity of said alkaline buffer salt so that the solution will be maintained substantially alkaline during the manipulation and filtration of the material, and so that the final product when acidified to the desired pH will be substantially isotonic with blood, filtering the solution through a bacteriological filter of the Mandler or Pasteur-Chamberland type, adding to the filtered solution an acidifying substance selected from the group consisting of phosphoric acid, sodium acid phosphate and potassium acid phosphate, and controlling the quantity of phosphoric acid, sodium acid phosphate and potassium acid phosphate so that the final solution will be sufficiently acid to best preserve the hormonal substances without being objectionable for parenteral injection, and will be substantially isotonic with blood.

6. A sterile solution suitable for parenteral injection of gonadotropic hormonal substances of the type existing in the blood or uterine tissue of animals of the equine group during early pregnancy, comprising the product produced by adding to a purified aqueous solution of said hormonal substances an alkaline buffer salt, controlling the quantity of said alkaline buffer salt so that the solution will be maintained substantially alkaline during the manipulation and filtration of the material and so that the final product when acidified to the desired pH will be substantially isotonic with blood, filtering the solution through a bacteriological filter of the Mandler or Pasteur-Chamberland type, adding to the filtered solution an acidifying substance selected from the group consisting of acids and from acid buffer salts, and controlling the quantity of said acidifying substance so that the final solution will have a pH sufficiently acid to best preserve the hormonal substances without being objectionable for parenteral injection and will be substantially isotonic with blood.

7. A sterile solution suitable for parenteral injection of gonadotropic hormonal substances of the type existing in the blood or uterine tissue of animals of the equine group during early pregnancy, comprising the product produced by alkalinizing a purified aqueous solution of said hormonal substances to a pH of over 7.5, filtering the solution through a bacteriological filter of the Mandler or Pasteur-Chamberland type, and adding to the filtered solution an acid reagent to give the final solution a pH of from 6 to 7.

8. The method of producing for parenteral injection a sterile solution of gonadotropic hormonal substances of the type existing in the blood or uterine tissue of animals of the equine group during early pregnancy, comprising alkalinizing a purified aqueous solution of said hormonal substances to a substantially alkaline state not harmful to the hormonal substances, filtering the solution through a bacteriological filter of the Mandler or Pasteur-Chamberland type, and after filtration rendering said solution sufficiently acid to best preserve the hormonal substances without being objectionable for parenteral injection.

EDWIN L. GUSTUS.